(12) United States Patent
Takagi et al.

(10) Patent No.: US 6,177,492 B1
(45) Date of Patent: Jan. 23, 2001

(54) THERMOPLASTIC RESIN COMPOSITION

(75) Inventors: Kiyoji Takagi; Koji Nishida; Tatuya Masuki; Shinya Miya; Kenichi Narita, all of Hiratsuka (JP)

(73) Assignee: Mitsubishi Engineering-Plastics Corporation, Tokyo (JP)

( * ) Notice: Under 35 U.S.C. 154(b), the term of this patent shall be extended for 0 days.

(21) Appl. No.: 09/261,250

(22) Filed: Mar. 3, 1999

(30) Foreign Application Priority Data

Mar. 3, 1998 (JP) .................................................. 10-066016
Mar. 3, 1998 (JP) .................................................. 10-066017
Oct. 8, 1998 (JP) .................................................. 10-286979

(51) Int. Cl.[7] ............................. C08K 5/49; C08G 63/48
(52) U.S. Cl. .............................. 524/120; 524/119; 525/67
(58) Field of Search .................................... 524/119, 120; 525/67

(56) References Cited

U.S. PATENT DOCUMENTS 5,254,610 * 10/1993 Small, Jr. et al. .................... 524/120
5,770,644 * 6/1998 Yamamoto et al. .................. 524/120
6,008,293 * 12/1999 Nakano et al. ......................... 525/67

* cited by examiner

*Primary Examiner*—Kriellion Sanders
(74) *Attorney, Agent, or Firm*—David G. Conlin; Lisa Swiszcz Hazzard; Dike, Bronstein, Roberts & Cushman, LLP

(57) ABSTRACT

The present invention relates to a thermoplastic resin composition comprising:
(A) 95 to 5 parts by weight of an aromatic polycarbonate,
(B) 5 to 95 parts by weight of a styrene-based resin, and
(C) a melt kneaded resin composition comprising a polyphenylene ether and a saturated polyester,
the amount of component (C) being 1 to 50 parts by weight based on 100 parts by total weight of the components (A) and (B).

12 Claims, No Drawings

THERMOPLASTIC RESIN COMPOSITION

BACKGROUND OF THE INVENTION

The present invention relates to a thermoplastic resin composition. More particularly, it relates to a novel thermoplastic resin composition comprising principally an aromatic polycarbonate and a styrene-based resin and having a good balance of properties such as rigidity and impact resistance and further excellent flame retardancy, and a process for producing thereof.

Aromatic polycarbonate/styrene-based resin compositions, a typical example of which is aromatic polycarbonate/ABS alloys, have been widely used in the art as a material which has good fluidity and high impact resistance. The flame retardants composition comprising such resin compositions have also been popularly used in the field of OA appliances. Regarding the flame-retardant compositions, particularly those comprising a phosphoric flame retardant, the representative ones are disclosed in Japanese Patent Application Laid-Open (KOKAI) Nos. 2-115262 and 2-32154. Also, in the field of OA appliances, especially in applications for specific purposes such as housing, the compositions (and the molded products thereof) are often required to be thin in thickness and high in rigidity and fluidity, and various materials that meet such requirements have been marketed.

However, aromatic polycarbonate resin and styrene-based resin are usually poor in compatibility each other. Therefore, the above-mentioned aromatic polycarbonate styrene-based resin compositions have a problem that in case where molding is conducted under some condition or a molding product having some shape is produced, laminar exfoliation occurs in the produced molding product or the impact resistance of produced molding product tends to reduce.

As a result of the present inventors' earnest studies to solve the above problems, it has been found that a thermoplastic resin composition having mixed therein a specified amount of a melt kneaded resin composition comprising an aromatic polycarbonate, a styrene-based resin, a polyphenylene ether and a saturated polyester has very good compatibility, preferable physical properties and excellent flame retardancy. The present invention has been attained on the basis of the above finding.

SUMMARY OF THE INVENTION

An object of the present invention is to provide a composition remarkably enhanced in aromatic polycarbonate/styrene-based resin compatibility for improving the balance of properties such as rigidity and impact resistance along with flame retardancy of the composition.

To attain the above object, in the first aspect of the present invention, there is provided a thermoplastic resin composition comprising:

(A) 95 to 5 parts by weight of an aromatic polycarbonate,
(B) 5 to 95 parts by weight of a styrene-based resin, and
(C) a melt kneaded resin composition comprising a polyphenylene ether and a saturated polyester,
the amount of component (C) being 1 to 50 parts by weight based on 100 parts by total weight of the components (A) and (B).

In the second aspect of the present invention, there is provided a thermoplastic resin composition comprising:

(A) 95 to 5 parts by weight of an aromatic polycarbonate,
(B) 5 to 95 parts by weight of a styrene-based resin, and
(C) a melt kneaded resin composition comprising a polyphenylene ether and a saturated polyester,
the amount of component (C) being 1 to 50 parts by weight based on 100 parts by total weight of the components (A) and (B), and the component (C) comprising:

(a) 95 to 20 parts by weight of a polyphenylene ether,
(b) 5 to 85 parts by weight of a saturated polyester, the total amount of the components (a) and (b) being 100 parts by weight,
(c) a phosphorous ester compound represented by the following formula (1), the amount of the component (c) being 0.1 to 10 parts by weight based on 100 parts by total weight of the components (a) and (b), and
(d) a phosphoric flame retardant, the amount of the component (d) being 5 to 200 parts by weight based on 100 parts by total weight of the components (a) and (b):

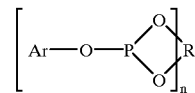

(1)

wherein Ar is a $C_6$–$C_{30}$ aromatic group which may be substituted; n is a number of 1 or 2; R is a $C_2$–$C_{18}$ alkylene group when n is 1, and a $C_4$–$C_{18}$ alkyltetrayl group when n is 2; Ar's may be identical or different, and the substituent of Ar and R may contain an oxygen atom, nitrogen atom, sulfur atom or halogen atom.

DETAILED DESCRIPTION OF THE INVENTION

The present invention is described in further detail.

The aromatic polycarbonates usable as component (A) in the present invention are the polycarbonate polymers or copolymers which may be branched and can be obtained by reacting aromatic hydroxyl compounds and a small quantity of polyhydroxyl compounds with phosgene or a carbonic acid diester. These polycarbonate polymers or copolymers may be used by mixing two or more of them.

The aromatic dihydroxyl compounds usable in the present invention include, for example, 2,2-bis(4-hydroxyphenyl)propane (=bisphenol A), tetramethylbisphenol A, bis(4-hydroxyphenyl)-p-diisopropylbenzene, hydroquinone, resorcinol and 4,4'-dihydroxydiphenyl. Of these compounds, bisphenol A is preferred.

In order to obtain a branched aromatic polycarbonate, a polyhydroxyl compound such as fluoroglycine, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)benzene or 1,1,1-tri(4-hydroxyphenyl)ethane, or a polyfunctional compound such as 3,3-bis(4-hydroxyaryl)oxyindole (=isatinbisphenol), 5-chloroisatin, 5,7-dichloroisatin or 5-bromoisatin is used as a part of the aromatic dihydroxyl compound mentioned above in an amount of usually 0.01 to 10% by mole, preferably 0.1 to 2% by mole.

As the aromatic polycarbonate, preferably a polycarbonate polymer derived from 2,2-bis(4-hydroxyphenyl)propane or a polycarbonate copolymer derived from 2,2-bis(4-hydroxyphenyl)propane and other aromatic dihydroxyl compound is used.

The molecular weight of the aromatic polycarbonate used in this invention is preferably in the range of 12,000 to 100,000, more preferably 16,000 to 30,000, especially preferably 18,000 to 23,000, in terms of viscosity-average molecular weight converted from the solution viscosity measured at 25° C. using methylene chloride as solvent.

For adjusting the molecular weight, a monovalent hydroxyl compound such as m- or p-methylphenol, m- or p-propylphenol, p-tert-butylphenol, p-long chain alkyl-substituted phenol or the like is used.

The styrene-based resin used as component (B) in the present invention is a polymer produced by polymerizing a styrene monomer for its main component. Examples of such polymers are homopolymers of styrene monomers, copolymers of styrene monomers and other copolymerizable monomers, and styrene-based graft copolymers produced by copolymerizing the monomers including a styrene monomer in the presence of a rubber component. Examples of the copolymers of styrene monomers and other copolymerizable monomers include AS resins, and examples of the styrene-based graft copolymers include HIPS resins, ABS resins, AES resins and AAS resins. Known polymerization methods such as emulsion polymerization, solution polymerization, suspension polymerization and bulk polymerization can be used for producing the styrene-based resins.

Exemplary of the styrene-based monomers are α-methylstyrene, p-methylstyrene and styrene itself. Of these, styrene is preferred. Examples of the monomers copolymerizable with styrene monomers include vinyl cyanide monomers such as acrylonitrile and methacrylonitrile, (meth)acrylic alkyl esters such as methylacrylate, ethyl acrylate, propyl acrylate, methyl methacrylate and ethyl methacrylate, maleimide and N-phenylmaleimide. Of these, vinyl cyanide monomers and (meth)acrylic alkyl esters are preferred.

The rubber component used for obtaining the styrene-based graft copolymers may, for instance, be diene rubber, acrylic rubber, ethylene/propylene rubber, silicone rubber or the like. Of these, diene rubber and acrylic rubber are preferred.

Examples of the diene rubbers include polybutadiene, butadiene/styrene copolymer, polyisoprene, butadiene/(meth)acrylic lower alkyl ester copolymer and butadiene/styrene/(meth)acrylic lower alkyl ester copolymer. Examples of the (meth)acrylic lower alkyl esters include methyl acrylate, ethyl acrylate, methyl methacrylate and ethyl methacrylate. The percentage of the (meth)acrylic lower alkyl ester in the butadiene/(meth)acrylic lower alkyl ester copolymer or butadiene/styrene/(meth)acrylic lower alkyl ester copolymer is preferably not more than 30% by weight of the rubber.

As acrylic rubber, there can he used, for example, alkyl acrylate rubbers in which the alkyl group has preferably 1 to 8 carbon atoms. Exemplary of such alkyl acrylate rubbers are ethyl acrylate, butyl acrylate and ethylhexyl acrylate. The crosslinkable ethylenic unsaturated monomers may be used for the alkyl acrylate rubbers. As crosslinking agent, alkylenediols, dia(meth)acrylates, polyester di(meth)acrylates, divinylbenzene, trivinylbenzene, triallyl cyanurate, allyl (meth)acrylate, butadiene, isoprene and the like can be used. The core-shell type polymers having a crosslinked diene rubber as the core can also be used as the acrylic rubber.

The polyphenylene ether (a) constituting the component (C) in the resin composition according to the present invention is a homopolymer or copolymer having the structure represented by the following formula (2):

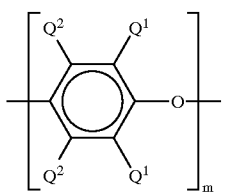

(2)

wherein each $Q^1$ is a halogen atom, a primary or secondary alkyl group, a phenyl group, an aminoalkyl group, a hydrocarbon-oxy group or a halohydrocarbon-oxy group; each $Q^2$ is a hydrogen atom, a halogen atom, a primary or secondary alkyl group, a phenyl group, a haloalkyl group, a hydrocarbon-oxy group or a halohydrocarbon-oxy group; and m is a number of not less than 10.

Preferred examples of the primary alkyl groups represented by $Q^1$ and $Q^2$ are methyl, ethyl, n-propyl, n-butyl, n-amyl, isoamyl, 2-methylbutyl, n-hexyl, 2,3-dimethylbutyl, and 2-, 3- or 4-methylpentyl or heptyl. Preferred examples of the secondary alkyl groups are isopropyl, sec-butyl and 1-ethylpropyl. In most cases, $Q^1$ is an alkyl or phenyl group, particularly a $C_1$–$C_4$ alkyl group, and $Q^2$ is a hydrogen atom.

The preferred polyphenylene ether homopolymers are, for instance, those comprising 2,6-dimethyl-1,4-phenylene ether units, and the preferred polyphenylene ether copolymers are the random copolymers comprising a combination of the above-said units and 2,3,6-trimethyl-1,4-phenylene ether units.

The polyphenylene ether used preferably has an inherent viscosity of 0.2 to 0.8 dl/g, more preferably 0.25 to 0.7 dl/g, even more preferably 0.3 to 0.6 dl/g, measured in chloroform at 30° C. If the inherent viscosity is less than 0.2 dl/g, the produced composition may lack impact resistance. If the inherent viscosity exceeds 0.8 dl/g, the gel content is too high and there may arise the problem in visual appearance of the molded product.

The saturated polyester (b) used in the present invention is the one which has —CO—O— bonds to the polymer backbone and which can be melted by heating. Various types of polyesters, such as those obtained by polycondensing dicarboxylic acids or their lower alkyl esters, acid halides or acid anhydride derivatives with a glycol or divalent phenol, can be used. Examples of the dicarboxylic acids include aliphatic dicarboxylic acids such as oxalic acid, malonic acid, succinic acid, glutaric acid, adipic acid, suberic acid, azelaic acid and sebacic acid, aromatic dicarboxylic acids such as terephthalic acid, isophthalic acid, p,p'-dicarboxydiphenyl sulfone, p-carboxyphenoxyacetic acid, p-carboxyphenoxypropionic acid, p-carboxyphenoxyacetic acid, p-carboxyphenoxyvaleric acid, 2,6-naphthalinedicarboxylic acid, 2,7-naphthalinedicarboxylic acid, and mixtures of these carboxylic acids. Examples of the glycols include $C_2$–$C_{12}$ linear alkylene glycols, for example, aliphatic glycols such as ethylene glycol, 1,3-propylene glycol, 1,4-butene glycol, 1,6-hexene glycol and 1,12-dodecamethylene glycol, alicyclic glycols such as 1,4-cyclohexanedimethanol, and aromatic glycols such as p-xylylene glycol. Examples of the divalent phenols include pyrocatechol, resorcinol, hydroquinone and alkyl-substituted derivatives of these compounds.

Polyesters produced from ring-opening polymerization of lactones such as polypivalolactone and poly(ε-caprolactone) are also usable. It is further possible to use polyesters known as thermotropic liquid crystal polymers (TLCP) which form liquid crystal in a molten state. Typical examples of the commercial products of such liquid crystal polyesters are X7G of Eastman Kodak Co., Xydar of Dartoko Co., Ltd., Econol of Sumitomo Chemical Co., and Vectora of Celanese Co., Ltd.

Preferred examples of the saturated polyesters are polyethylene terephthalate (PET), polybutylene terephthalate (PBT), polyethylene naphthalate (PEN), poly(1,4-cyclohexanedimethylene terephthalate) (PCT) and the above-mentioned liquid crystal polyesters. The viscosity of the saturated polyester used in this invention is preferably in the range of 0.3 to 5.0 dl/g, more preferably 0.4 to 4.0 dl/g, particularly 0.5 to 2.0 dl/g, in terms of inherent viscosity measured in a 60/40 (wt%) phenol/1,1,2,2-tetrachloroethane mixed solution at 20° C. If the inherent viscosity is less than 0.5 dl/g, the produced composition may lack impact resistance. If the inherent viscosity exceeds 5.0 dl/g, the composition may have the problem in moldability.

It is also preferable that the component (C) contain a phosphorous ester compound (c). The phosphorous ester compound used in the present invention is a phosphorous triester compound, and it is possible to use all of the known phosphorous triester compounds.

Examples of such phosphorus triester compounds include those represented by the following formulae (3) and (4):

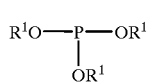

(3)

wherein $R^1$ is a $C_1$–$C_{20}$ alkyl group or a $C_6$–$C_{30}$ aromatic group which may be substituted, and the substituent of $R^1$ may be the one containing an oxygen atom, nitrogen atom, sulfur atom or halogen atom; $R^1$'s may be different from each other.

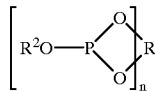

(4)

wherein $R^2$ is a $C_1$–$C_{20}$ alkyl group, or a $C_6$–$C_{30}$ aromatic group which may be substituted; n is a number of 1 or 2; and R is a $C_2$–$C_{18}$ alkylene or arylene group when n is 1, and a $C_4$–$C_{18}$ alkyltetrayl group when n is 2; $R^2$'s may be identical or different, and the substituent of $R^2$ and R may contain an oxygen atom, nitrogen atom, sulfur atom or halogen atom.

In the above formulae (3) and (4), $R^1$ and $R^2$ represent an aliphatic group such as methyl, ethyl, propyl, octyl, isooctyl, isodecyl, decyl, stearyl and lauryl; an aromatic group such as phenyl, biphenyl and naphthyl; or a substituted aromatic group such as 2-, 3- or 4-methylphenyl, 2,4- or 2,6-dimethylphenyl, 2,3,6-trimethylphenyl, 2-, 3- or 4-ethylphenyl, 2,4- or 2,6-diethylphenyl, 2,3,6-triethylphenyl, 2-, 3- or 4-tert-butylphenyl, 2,4- or 2,6-di-tert-butylphenyl, 2,6-di-tert-butyl-4-methylphenyl, 2,6-di-tert-butyl-4-ethylphenyl, octylphenyl, isooctylphenyl, 2-, 3- or 4-nonylphenyl, and 2,4-dinonylphenyl. Preferably, $R^1$ and $R^2$ represent an aromatic group which may be substituted.

As for R in the formula (4), when n is 1, R represents, for instance, such group as 1,2-phenylene, ethylene, propylene, trimethylene, tetramethylene, hexamethylene or the like, and when n is 2, R represents, for instance, a tetrayl group having a pentaerythrityl structure represented by the following formula (5):

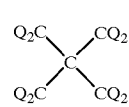

(5)

wherein each Q is a hydrogen atom or a $C_1$–$C_6$ alkyl group.

Examples of the phosphorous ester compounds represented by the above-shown formula (3) include trioctyl phosphite, tridecyl phosphite, trilauryl phosphite, tristearyl phosphite, triisooctyl phosphite, tris(nonylphenyl) phosphite, tris(2,4-dinonylphenyl) phosphite, tris(2,4-di-tert-butylphenyl) phosphite, triphenyl phosphite, tris (octylphenyl) phosphite, diphenylisooctyl phosphite, diphenylisodecyl phosphite, octyldiphenyl phosphite, dilaurylphenyl phosphite, diisodecylphenyl phosphite, bis (nonylphenyl)phenyl phosphite, and diisooctylphenyl phosphite.

Examples of the phosphorous ester compounds represented by the formula (4) include those of the formula (4) wherein $R^2$ is an aromatic group, such as diisodecylpentaerythritol diphosphite, dilaurylpentaerythritol diphosphite and distearylpentaerythritol diphosphite, but it is preferable to use the compounds of the formula (4) wherein $R^2$ is an aromatic group which may be substituted, viz. phosphorous esters represented by the following formula (1):

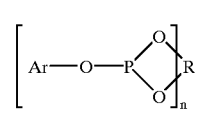

(1)

wherein Ar is a $C_6$–$C_{30}$ aromatic group which may be substituted; n is a number of 1 or 2; and R is a $C_2$–$C_{18}$ alkylene or arylene group when n is 1, and a $C_4$–$C_{18}$ alkyltetrayl group when n is 2; Ar's may be identical or different, and the substituent of Ar and R may contain an oxygen atom, nitrogen atom, sulfur atom or halogen atom. Listed below are the preferred examples of the phosphorous ester compounds represented by the formula (1). When n=1: (phenyl) (1, 3-propanediol)phosphite, (4-methylphenyl) (1,3-propanediol)phosphite, (2,6-dimethylphenyl) (1,3-propanediol)phosphite, (4-tert-butylphenyl)(1,3-propanediol)phosphite, (2,4-di-tert-butylphenyl)(1,3-propanediol)phosphite, (2,6-di-tert-butyleylphenyl)(1,3-propanediol)phosphite, (2,6-di-tert-butyl-4-methylphenyl) (1,3-propanediol)phosphite, (phenyl)(1,2-ethanediol) phosphite, (4-methylphenyl)(1,2-ethanediol)phosphite, (2,6-dimethylphenyl)(1,2-ethanediol)phosphite, (4-tert-butylphenyl)(1,2-ethanediol)phosphite, (2,4-di-tert-butylphenyl)(1,2-ethanediol)phosphite, (2,6-di-tert-butylphenyl)(1,2-ethanediol)phosphite, (2,6-di-tert-butyl-4-methylphenyl)(1,2-ethanediol)phosphite, and (2,6-di-tert-butyl-4-methylphenyl)(1,4-butanediol)phosphite. When n=2: diphenylpentaerythritol diphosphite, bis(2-methylphenyl)pentaerythritol diphosphite, bis(3-methylphenyl)pentaerythritol diphosphite, bis(4-methylphenyl)pentaerythritol diphosphite, bis(2,4-dimethylphenyl)pentaerythritol diphosphite, bis(2,6-dimethylphenyl)pentaerythritol diphosphite, bis(2,3,6-trimethylphenyl)pentaerythritol diphosphite, bis(2-tert-butylphenyl)pentaerythritol diphosphite, bis(3-tert-butylphenyl)pentaerythritol diphosphite, bis(4-tert-butylphenyl)pentaerythritol diphosphite, bis(2,4-di-tert-butylphenyl)pentaerythritol diphosphite, bis(2,6-di-tertbutylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis(nonylphenyl)pentaerythritol diphosphite, bis(phenyl)pentaerythritol diphosphite, and dinaphthylpentaerythritol diphosphite.

Of these compounds, bis(nonylphenyl)pentaerythritol diphosphite, bis(2,4-di-tert-butylphenyl)pentaerythritol diphosphite and bis(2,6-di-tert-butyl-4-methylphenyl)pentaerythritoldiphosphite are more preferred.

The composition of the present invention may contain a compound produced from decomposition (such as hydrolysis or pyrolysis) of a phosphorous ester compound.

It is preferable that the component (C) further contains a phosphoric flame retardant (d).

The phosphoric flame retardants usable in the present invention are the compounds containing phosphorus in the molecule, usually pentavalent phosphorus compounds, preferably phosphoric ester compounds represented by the following formula (6) or (7). These compounds may be used as a mixture of two or more of them.

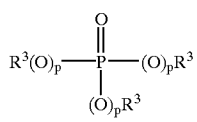
(6)

wherein each $R^3$ is a $C_1-C_6$ alkyl group or a $C_6-C_{20}$ aryl group which may be alkyl-substituted; each p is a number of 0 or 1; and $R^3$'s and p's may be identical or different.

Examples of the phosphoric ester compounds represented by the formula (6) include triphenyl phosphate, tricresyl phosphate, diphenyl-2-ethylcresyl phosphate, tri(isopropylphenyl) phosphate, diphenyl methylphosphonate, diethyl phenylphosphonate, diphenylcresyl phosphate, and tributyl phosphate. These compounds can be produced from phosphorus oxychloride, etc., in the known way.

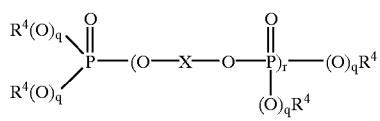
(7)

wherein each $R^4$ is a $C_1-C_6$ alkyl group or a $C_6-C_{20}$ aryl group which may be alkyl-substituted; each q is a number of 0 or 1; r is an integer of 1 to 5; X is an arylene group; and $R^4$'s, q's and X's may be identical or different.

The phosphoric ester compounds represented by the formula (7) are the condensed phosphoric esters, and the arylene group (X) interposed between the pentavalent phosphorus atoms is a group derived from a dihydroxyl compound such as resorcinol, hydroquinone, bisphenol A and the like. Examples of the condensed phosphoric esters, in case where X is a group derived from resorcinol, include phenyl resorcin polyphosphate, cresyl resorcin polyphosphate, phenyl cresyl resorcin polyphosphate, xylyl resorcin polyphosphate, phenyl p-tert-butylphenyl resorcin polyphosphate, phenyl isopropylphenyl resorcin polyphosphate, cresyl xylyl resorcin polyphosphate, and phenyl isopropylphenyl diisopropylphenyl resorcin polyphosphate.

The resin composition of the present invention may contain a phosphoric flame retardant (D) in addition to the said components (A), (B) and (C). The same materials as used for the phosphoric flame retardant (d) explained above may be used for the phosphoric flame retardant (D) as well. The phosphoric flame retardant (D) and the phosphoric flame retardant (d) may be identical or deferent.

Phosphoric flame retardant may be blended as component (D), but preferably it is used as component (c), namely it is melt kneaded with a polyphenylene ether (component (a)) and a saturated polyester (component (b)), preferably in the presence of a phosphorous ester compound (component (d)),to prepare a melt kneaded resin composition (C), and this is blended in a resin composition comprising the components (A) and (B). However, in case where it is difficult to effectuate melt kneading sufficiently due to some cause or other, e.g. large supply of the phosphoric flame retardant, it is preferable to blend it as component (D).

In case where the resin composition according to the present invention used as a flame retardant resin composition, the resin composition preferably contains a polytetrafluoroethylene (E) in addition to the said components (A), (B) and (C).

The polytetrafluoroethylene used as component (E) in the present invention is, for example, polytetrafluoroethylene having the fibril forming properties. Such polytetrafluoroethylene is easily dispersed in the polymers and has a tendency to bind the polymer molecules to form a fibrous structure. The polytetrafluoroethylene having the fibril forming properties is divided into three types according to ASTM standards (D3294-81). The polytetrafluoroethylene having the fibril forming properties is commercially available under the trade names of, for example, Teflon 6J and Teflon 30J from Mitsui Du Pont Fluorochemical Co., and Polyflon from Daikin Industries Co., Ltd.

The compositional percentage of the components (A)~(E) are as shown below. (The features are based on the combined amount of (A) and (B) which is indicated as 100 parts by weight).

The percentage of the aromatic polycarbonate (component (A)) is 5 to 95% by weight, preferably 15 to 90% by weight, even more preferably 30 to 80% by weight.

The percentage of the styrene-based resin (component (B)) is 95 to 5% by weight, preferably 85 to 10% by weight, more preferably 20 to 70% by weight.

If the percentage of the component (A) in the composition is less than 5% by weight, the composition may lack impact resistance, and if it exceeds 95% by weight, the composition may be unsatisfactory in moldability. If the percentage of the component (B) is less than 5% by weight, the composition may have the problem in moldability, and if it exceeds 95% by weight, the composition may lack impact resistance.

The amount of the melt kneaded resin composition used as component (C) is 1 to 50 parts by weight, preferably 5 to 30 parts, more preferably 7 to 20 parts by weight based on 100 parts by total weight of the components (A) and (B). If the amount of the component (C) is less than 1 parts by weight, its effect as a compatibility improver for the components (A) and (B) is small and it may be unable to provide the aimed composition property improving effect. On the other hand, the amount of the component (C) exceeds 50 parts by weight, there may arise the problem in visual appearance of the molded product.

The compositional amounts of the components (a)~(d) constituting the component (C), based on the total amount of (a) and (b) which is expressed as 100 parts by weight, are set forth below.

The percentage of the polyphenylene ether (component (a)) is usually 15 to 97% by weight, preferably 20 to 95% by weight, more preferably 30 to 90% by weight, even more preferably 55 to 85% by weight.

The amount of the saturated polyester (component (b)) is 85 to 3% by weight, preferably 80 to 5% by weight, more preferably 45 to 15% by weight.

If the amount of the component (a) in the resin composition is less than 15% by weight, the produced composition may lack impact resistance, heat resistance and flame retardancy, and if its amount exceeds 97% by weight, the composition may be unsatisfactory in impact resistance and fluidity. If the amount of the component (b) is less than 3% by weight, the composition may lack impact resistance and fluidity, while if its amount exceeds 85% by weight, impact resistance, heat resistance and flame retardancy of the composition may become unsatisfactory.

The amount of the phosphorous ester compound used as component (c) is usually 0.05 to 20 parts by weight, preferably 0.1 to 10 parts by weight, more preferably 0.5 to 3 parts by weight, based on 100 parts by total weight of the components (a) and (b). If the amount of the component (c) is less than 0.05 parts by weight, its effect as a compatibility improver for the components (a) and (b) is small and it may be unable to provide the aimed composition property improving effect. On the other hand, the amount of the component (c) exceeds of 20 parts by weight, there may arise the problem in appearance of the molded product.

The phosphoric flame retardant (component (d)) is used in an amount of 5 to 200 parts by weight, preferably 10 to 50 parts by weight, to 100 parts by total weight of the components (a) and (b). The amount of the component (d) exceeds 200 parts by weight, there may arise the problem in visual appearance of the molded product.

The amount of the phosphoric flame retardant used as component (D) is 0 to 100 parts by weight, preferably 5 to 20 parts by weight based on 100 parts by total weight of the components (A) and (B). If its amount exceeds 100 parts by weight, there may arise the problem in visual appearance of the molded product.

The polytetrafluoroethylene (component (E)) is blended in an amount of 0 to 5 parts by weight based on 100 parts by total weight of the components (A) and (B). If its amount exceeds 5 parts by weight, it may cause impairment of visual appearance of the molded product.

The thermoplastic resin composition according to the present invention may have, beside the said components (A)~(E), various additive components within limits not affecting the effect of the present invention.

A typical example of such additive components is plasticizer. It is possible to use any type of plasticizer as far as it has a plasticizing effect for the aromatic polycarbonates. Examples of such plasticizers include aromatic hydrocarbons such as benzene, toluene and xylene; chain or cyclic aliphatic hydrocarbons such as heptane and cyclohexane; halogenated hydrocarbons such as chlorobenzene, dichlorobenzene, trichlorobenzene and dichloromethane; ethers such as dioxane and diethyl ether; ketones such as cyclohexanone and acetophenone; esters such as ethyl acetate and propiolactone; nitriles such as acetonitrile and benzonitrile; alcohols such as methanol, ethanol, n-propanol, isopropanol, n-butanol and sec-butanol; nitrobenzene, sulforan and the like. These plasticizers may be used either singly or as a mixture. It is preferred to use those whose solubility parameter is within the range of 7 to 11.5.

The amount of the additive component(s) to be blended is usually 0.01 to 5 parts by weight in the case of impact resistance improver, antioxidant, weathering resistance improver, alkaline soap, metallic soap, hydrotalcite and the like, 5 to 30 parts by weight in the case of plasticer and fluidity improver, 0.5 to 2 parts in the case of nucleating agent, 5 to 50 parts by weight in the case of flame retardant, and 0.1 to 10 parts by weight in the case of drip inhibitor, based on the total amount of components (A) and (B) which is expressed as 100 parts by weight.

Blending of organic filler, inorganic filler, reinforcements, particularly glass fiber, mica, talc, wollastonite, potassium titanate, calcium carbonate, silica and the like in an amount of 5 to 50 parts by weight is conducive to the improvement of rigidity, heat resistance and dimensional precision of the molded products. A colorant and its dispersant may also be blended in an amount of usually 0.5 to 5 parts by weight. If necessary, other types of thermoplastic resin, such as polyethylene, polypropylene and polyamide resins, may be blended. Preferably polyethylene or thermoplastic elastomer is added in an amount of 2 to 10 parts by weight to improve impact resistance.

The thermoplastic elastomer blended in the polycarbonate resin composition is not restricted as far as the mechanical properties of the polycarbonate resin composition can be improved thereby. Examples of the thermoplastic elastomer according to the present invention, are polystyrene-based elastomer or hydrogenated product thereof such as SEBS and SEPS, polyolefin-based elastomer such as TPO, polyester-based elastomer, silicon-based rubber, acrylate-based rubber and graft copolymer of composite rubber-based thereabove.

The method for producing the resin composition of the present invention is not specified, but preferably melt kneading is used. The kneading methods generally used for the thermoplastic resins can be applied. For the component (C), however, the specified components thereof need to be beforehand worked into a melt kneaded composition. This can inhibit macro-phase separation of the components (A) and (B), thus preventing skin/core separation of the molded product.

For example, the component (C) is previously prepared by melt kneading or other method, and after it has been pelletized or powdered, the components (A)~(E), if necessary along with the additive materials such as mentioned above, are uniformly mixed by a preferable mixing means such as Henschel mixer, ribbon blender or V-type blender, and further kneaded by a proper kneading means such as single- or double-screw kneading extruder, roll mill, Banbury mixer or laboplastomill (Brabender).

The respective components and the additive materials may be fed either all at one time or successively to the kneader. It is also possible to use a mixture or mixtures which have previously been prepared by mixing two or more of the components and additive materials.

The kneading temperature and the kneading time can be optionally set according to the aimed final composition and the operating conditions such as the type of the kneader used, but it is usually preferable that the kneading temperature is from 150 to 350° C. and the kneading time is not longer than 20 minutes. If the kneading temperature and time exceed 350° C. and 20 minutes, respectively, heat deterioration of the aromatic polycarbonate and styrene-based resin may be deteriorated in the properties or visual appearance of the molded product.

The molding method of the thermoplastic resin composition of the present invention is not specified; it is possible to use any of the molding methods commonly used for the thermoplastic resins, such as injection molding, blow molding, extrusion molding, press molding, etc., but blow molding or extrusion molding is preferred.

According to the present invention, it is possible to obtain a thermoplastic resin composition capable of providing the molded products with remarkably improved impact resistance, well-balanced mechanical strength and excellent flame retardancy, by blending a composition comprising a polyphenylene ether, a saturated polyester and a phosphoric flame retardant for improving aromatic polycarbonate/ styrene-based resin compatibility and flame retardancy.

EXAMPLES

The present invention is hereinafter described in further detail by showing the examples thereof, but it is understood that these examples are merely intended to be illustrative and not to be construed as limiting the scope of the invention in any way.

The abbreviations and substance of the respective components used in the following Examples and Comparative Examples are as follows.

Polycarbonate:
  PC: 2,2-bis(4-oxyphenyl)propane-based polycarbonate (trade name: IUPILON S2000, viscosity-average molecular weight=25,000, produced by Mitsubishi Engineering-Plastics Corporation)

Styrene resins:
  HIPS: styrene graft copolymer, rubber component: polybutadiene (trade name: Diarex HT478 produced by Mitsubishi Chemical Corporation)
  GPPS: polystyrene (trade name: Diarex HH102 produced by Mitsubishi Chemical Corporation)

Polyphenylene ether:
  PPE: poly(2,6-dimethyl-1,4-phenylene ether) (trade name: H-53 produced by Nippon Polyether Co., inherent viscosity measured in chloroform at 30° C.=0.53 dl/g)

Saturated polyesters:
  PBT: polybutylene terephthalate (trade name: PBT 124 produced by Kanebo Co., Ltd., injection molding grade, inherent viscosity measured in 60/40 (wt %) phenol/1,1,2,2-tetrachloroethane mixed solution at 20° C.=2.4 dl/g.
  PBT1: polybutylene terephthalate (trade name: PBT 124 produced by Kanebo Co., Ltd., injection molding grade, inherent viscosity measured in 60/40 (wt %) phenol/1,1,2,2-tetrachloroethane mixed solution at 20° C.=1.06 dg/g)
  PBT2: polybutylene terephthalate (trade name: Novadul 5040ZS produced by Mitsubishi Engineering-Plastics Corporation, inherent viscosity measured in 60/40 (wt %) phenol/1,1,2,2-tetrachloroethane mixed solution at 20° C.=1.4 dg/g)

Phosphorous ester compound:
  PEP: bis(2,6-di-tert-butyl-4-methylphenyl)pentaerythritol diphosphite (trade name: MARK PEP-36 produced by Asahi Denka KK)

Phosphoric flame retardants:
  TPP: triphenyl phosphate (produced by Daihachi Chemical Industries Co., Ltd.)
  CR: phenyl resorcinol polyphosphate (trade name: CR733S produced by Daihachi Chemical Industries Co., Ltd.)
  FP: xylyl resorcinol polyphosphate (trade name: ADK-STAB FP500 produced by Asahi Denka KK)

Polytetrafluoroethylene:
  PTFE: (trade name: Polyflon F201L produced by Daikin Chemical Industries Co., Ltd.)

PE: (trade name: Novatec SF230 produced by Mitsubishi Chemical Corporation)

Thermoplastic elastomer:
  ELA: (trade name: Paraloid EXL2603 produced by Kureha Chemical Industry Co.)

EXAMPLES 1–9 AND COMPARATIVE EXAMPLE 4

For preparing the component (C), the components (a)~(c) were mixed well with stirring by a supermixer at the amounts shown in Table 1, and the mixture was supplied into a vented double-screw extruder TEX44 (mfd. by Japan Steel Works, Ltd.) and melt kneaded under the conditions of setting temperature of 210° C. and screw speed of 250 rpm by reducing the pressure 10 Torr from that at the vent hole located downstream of the first hopper. The resulting composition was pelletized and dried by a hot-air dryer at 105° C. for 8 hours to prepare the component (C). The average kneading time was 100 seconds.

Then the components (A)~(E) and the additive materials were mixed well with stirring by a supermixer at the amounts shown in Table 1, and the mixture was supplied into a vented double-screw extruder TEX44 (mfd. by Japan Steel Works, Ltd.) and melt kneaded under the conditions of setting temperature of 210° C. and screw speed of 250 rpm by reducing the pressure 10 Torr from that at the vent hole located downstream of the first hopper. The resulting composition was pelletized and dried by a hot-air dryer at 105° C. for 8 hours to obtain a thermoplastic resin composition. The average kneading time was 100 seconds.

EXAMPLES 10–14

For preparing the component (C), the components (a)~(d) and a part or all of the component (D), if necessary, were mixed well with stirring by a supermixer at the amounts shown in Table 1, and the mixture was supplied into a vented double-screw extruder TEX44 (mfd. by Japan Steel Works, Ltd.) and melt kneaded under the conditions of setting temperature of 250° C. and screw speed of 200 rpm by reducing the pressure 10 Torr from that at the vent hole located downstream of the first hopper. The resulting composition was pelletized and dried by a hot-air dryer at 60° C. for 8 hours to prepare the component (C). The production rate was 15 kg/hr.

Then the components (A)~(E) and ELA, if necessary, were mixed well with stirring by a supermixer at the amounts shown in Table 1, and the mixture was supplied into a vented double-screw extruder TEX44 (mfd. by Japan Steel Works, Ltd.) and melt kneaded under the conditions of setting temperature of 220° C. and screw speed of 150 rpm by reducing the pressure 10 Torr from that at the vent hole located downstream of the first hopper. The production rate was 15 kg/hr. The resulting composition was pelletized and dried by a hot-air dryer at 80° C. for 6 hours to obtain a thermoplastic resin composition. After drying, the thermoplastic resin composition was injection-molded to obtain test pieces used for evaluation thereof.

COMPARATIVE EXAMPLES 1–3 AND 5–7

In the process of Example 1, the components (A), (B), (D) and (E), the components (a) and (b) and the additive materials were melt kneaded at the amounts shown in Table 1, skipping the preceding melt kneading operation for preparing a the component (C), to obtain the thermoplastic resin compositions.

COMPARATIVE EXAMPLE 8

In the process of Example 9, the components (A), (B), (D) and (E), the components (a) and (b) and the additive materials were melt kneaded at the amounts shown in Table 1, skipping the preceding melt kneading operation for preparing the component (C), to obtain the thermoplastic resin compositions.

EVALUATION

The specified test pieces were molded from the thermoplastic resin compositions obtained in the Examples and Comparative Examples and their properties and property values were determined. The results are shown in Table 1. The polyethylene terephthalates and the compositions were dried in vacuo at 120° C. for 5 hours before kneading and molding.

(1) Melt flow rate (MFR)

Measured according to JIS K 7210 at 260° C. under a load of 5 kg.

(2) Bending modulus

Measured according to ISO R178-1974 Procedure 12 (JIS K 7203) using an Instron tester.

(3) Izod impact strength

Measured according to ISO R180-1969 (JIS K 7110) notched Izod impact strength test using an Izod impact tester mfd. by Toyo Fine Machinery Co., Ltd. The composition of the present invention preferably has Izod impact strength of not less than 9 kgf.cm/cm.

(4) Flame retardancy and gross combustion time

Flame retardancy was evaluated by a vertical combustion test conducted on the 1.6 mm thick UL Standard test pieces. Gross combustion time is the total of the combustion times of 5 test pieces specified by the UL Standard. In case where the resin composition according to the present invention is used as the flame retardant resin composition, it is preferred that the flame retardancy is V-0.

(5) Heat deformation temperature

Measured according to JIS K 7207 under a load of 4.6 kg using a HDT tester mfd. by Toyo Fine Machinery Co., Ltd.

TABLE 1

| Components | Example 1 | Example 2 | Example 3 | Example 4 |
|---|---|---|---|---|
| (A) PC | 40 | 40 | 40 | 60 |
| (B) HIPS | 60 | 60 | 60 | 40 |
| (C) Melt kneaded resin composition | 10 | 14 | 10.1 | 10.1 |
| (a) PPE | 8 | 8 | 8 | 4 |
| (b) PBT | 2 | 2 | 2 | 6 |
| (c) PEP | — | — | 0.1 | 0.1 |
| (d) TPP | — | 4 | — | — |
| PE | — | — | — | 2 |
| MFR (g/10 min) | 50 | 63 | 57 | 35 |
| Bending modulus | 23000 | 23800 | 23000 | 24500 |
| Izod (kgf · cm/cm) | 9 | 14 | 20 | 31 |
| Heat deformation temperature (° C.) | 112 | 108 | 115 | 129 |

| Components | Example 5 | Example 6 | Comp. Example 1 | Comp. Example 2 |
|---|---|---|---|---|
| (A) PC | 30 | 80 | 40 | 40 |
| (B) HIPS | 70 | 20 | 60 | 60 |
| (C) Melt kneaded resin composition | 10.1 | 10.1 | — | — |
| (a) PPE | 8 | 8 | — | 8 |
| (b) PBT | 2 | 2 | — | 2 |
| (c) PEP | 0.1 | 0.1 | — | — |
| (d) TPP | — | — | — | — |
| PE | 2 | 2 | — | — |
| MFR (g/10 min) | 65 | 30 | 55 | 60 |
| Bending modulus | 22000 | 24000 | 23300 | 23800 |
| Izod (kgf · cm/cm) | 12 | 76 | 4 | 2 |
| Heat deformation temperature (° C.) | 105 | 141 | 111 | 109 |

| Components | Comp. Example 3 | Comp. Example 4 | Comp. Example 5 |
|---|---|---|---|
| (A) PC | 40 | 40 | 80 |
| (B) HIPS | 60 | 60 | 20 |
| (C) Melt kneaded resin composition | — | 10.1 | — |
| (a) PPE | 8 | — | 8 |
| (b) PBT | 2 | 10 | 2 |
| (c) PEP | 0.1 | 0.1 | 0.1 |
| (d) TPP | — | — | — |
| PE | — | — | 2 |
| MFR (g/10 min) | 58 | 66 | 28 |
| Bending modulus | 23800 | 23500 | 23500 |
| Izod (kgf · cm/cm) | 3 | 4 | 6 |
| Heat deformation temperature (° C.) | 109 | 100 | 132 |

TABLE 2

| Components | Example 7 | Example 8 | Example 9 | Comp. Ex. 6 | Comp. Ex. 7 |
|---|---|---|---|---|---|
| (A) PC | 60 | 60 | 80 | 60 | 80 |
| (B) HIPS | 40 | 40 | 20 | 40 | 20 |
| (C) Melt kneaded resin composition | 14.1 | 20.1 | 14.1 | — | — |
| (a) PPE | 8 | 8 | 4 | — | 8 |
| (b) PBT | 2 | 2 | 6 | — | 2 |
| (c) PEP | 0.1 | 0.1 | 0.1 | — | — |
| (d) TPP | 4 | 10 | 4 | — | — |
| (D) TPP | — | — | — | 10 | 10 |
| (E) PTFE | 0.5 | 0.5 | — | 0.5 | 0.5 |
| PE | 2 | — | 2 | 2 | — |
| MFR (g/10 min) | 35 | 40 | 25 | 38 | 39 |
| Bending modulus | 24000 | 24100 | 26500 | 23400 | 26300 |
| Izod (kgf · cm/cm) | 16 | 19 | 35 | 4 | 8 |
| Flame retardancy | V-O | V-O | V-O | V-O | V-O |
| Gross combustion time (sec.) | 20 | 11 | 5 | 44 | 25 |
| Heat deformation temperature (° C.) | 93 | 98 | 110 | 86 | 102 |

TABLE 3

| Components | Example 10 | Example 11 | Example 12 |
|---|---|---|---|
| (A) PC | 70 | 70 | 70 |
| (B) GPPS | 30 | 30 | 30 |
| HIPS | — | — | — |
| (C) Melt kneaded resin composition | 5.1 | 5.1 | 5.1 |
| (a) PPE | 2.4 | 2.4 | 2.4 |
| (b) PBT1 | — | — | — |
| PBT2 | 0.6 | 0.6 | 0.6 |
| (c) PEP | 0.1 | 0.1 | 0.1 |
| (d) TPP | 2.0 | 2.0 | 2.0 |
| CR | — | — | — |
| FP | — | — | — |
| (D) TPP | — | — | — |

TABLE 3-continued

| Components | | | |
|---|---|---|---|
| CR | 13 | 13 | — |
| FP | — | — | 13 |
| (E) PTFE | 0.5 | 0.5 | 0.5 |
| PE | — | — | — |
| ELA | — | 8 | 8 |
| MFR (g/10 min) | 43 | 41 | 39 |
| Bending modulus | 27300 | 26800 | 26500 |
| Izod (kgf · cm/cm) | 16 | 32 | 34 |
| Flame retardancy | V-O | V-O | V-O |
| Gross combustion time (sec.) | 38 | 42 | 48 |
| Heat deformation temperature (° C.) | 85 | 84 | 86 |

| | Example 13 | Example 14 | Comp. Example 8 |
|---|---|---|---|
| (A) PC | 70 | 70 | 70 |
| (B) GPPS | — | — | 30 |
| HIPS | 30 | 30 | — |
| (C) Melt kneaded resin composition | 5.1 | 5.1 | — |
| (a) PPE | 2.4 | 2.4 | — |
| (b) PBT1 | — | — | — |
| PBT2 | 0.6 | 0.6 | — |
| (c) PEP | 0.1 | 0.1 | — |
| (d) TPP | 2.0 | — | — |
| CR | — | — | — |
| FP | — | 2.0 | — |
| (D) TPP | — | — | 2 |
| CR | — | — | 11 |
| FP | 9 | 9 | — |
| (E) PTFE | 0.5 | 0.5 | 0.5 |
| PE | — | — | — |
| ELA | — | — | — |
| MFR (g/10 min) | 35 | 34 | 47 |
| Bending modulus | 26100 | 26000 | 27000 |
| Izod (kgf · cm/cm) | 42 | 39 | 13 |
| Flame retardancy | V-O | V-O | N G |
| Gross combustion time (sec.) | 39 | 41 | 352 |
| Heat deformation temperature (° C.) | 91 | 92 | 83 |

What is claimed is:

1. A thermoplastic resin composition comprising:

(A) 95 to 5 parts by weight of an aromatic polycarbonate, (B) 5 to 95 parts by weight of a styrene-based resin, and (C) a melt kneaded resin composition comprising a polyphenylene ether and a saturated polyester, the amount of component (C) being 1 to 50 parts by weight based on 100 parts by total weight of the components (A) and (B).

2. A thermoplastic resin composition according to claim 1, wherein the component (C) comprises:

(a) 95 to 20 parts by weight of a polyphenylene ether, (b) 5 to 80 parts by weight of a saturated polyester, the total amount of the components (a) and (b) being 100 parts by weight, and (c) a phosphorous ester compound in an amount of 0.1 to 10 parts by weight based on 100 parts by weight of the total components (a) and (b).

3. A thermoplastic resin composition according to claim 1, wherein the phosphorous ester compound is represented by the following formula (1):

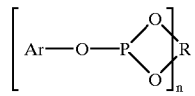

wherein Ar is a $C_6$–$C_{30}$ aromatic group which may be substituted; n is a number of 1 or 2; R is a $C_2$–$C_{18}$ alkylene group when n is 1, and a $C_4$–$C_{18}$ alkyltetrayl group when n is 2; Ar's may be identical or different, and the substituent of Ar and R may contain an oxygen atom, nitrogen atom, sulfur atom or halogen atom.

4. A thermoplastic resin composition according to claim 1, wherein the component (C) further comprises a phosphoric flame retardant.

5. A thermoplastic resin composition according to claim 4, wherein the component (C) comprises:

(a) 95 to 20 parts by weight of a polyphenylene ether, (b) 5 to 80 parts by weight of a saturated polyester, the total amount of the components (a) and (b) being 100 parts by weight, (c) a phosphorous ester compound represented by the following formula (1), the amount of the component (c) being 0.1 to 10 parts by weight based on 100 parts by total weight of the components (a) and (b), and (d) a phosphoric flame retardant, the amount of the component (d) being 5 to 200 parts by weight based on 100 parts by total weight of the components (a) and (b):

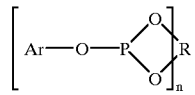

wherein Ar is a $C_6$–$C_{30}$ aromatic group which may be substituted; n is a number of 1 or 2; R is a $C_2$–$C_{18}$ alkylene group when n is 1, and a $C_4$–$C_{18}$ alkyltetrayl group when n is 2; Ar's may be identical or different, and the substituent of Ar and R may contain an oxygen atom, nitrogen atom, sulfur atom or halogen atom.

6. A thermoplastic resin composition according to claim 4, further comprising a phosphoric flame retardant (D) in an amount of not more than 100 parts by weight based on 100 parts by total weight of the components (A) and (B).

7. A thermoplastic resin composition according to claim 4, further comprising a polytetrafluoroethylene (E) in an amount of not more than 5 parts by weight based on 100 parts by total weight of the components (A) and (B).

8. A thermoplastic resin composition according to claim 4, wherein the phosphorous ester compound is represented by the following formula (1):

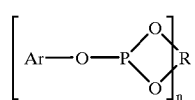

wherein Ar is a $C_6$–$C_{30}$ aromatic group which may be substituted; n is a number of 1 or 2; R is a $C_2$–$C_{18}$ alkylene group when n is 1, and a $C_4$–$C_{18}$ alkyltetrayl group when n is 2; Ar's may be identical or different, and the substituent of Ar and R may contain an oxygen atom, nitrogen atom, sulfur atom or halogen atom.

9. A thermoplastic resin composition according to claim 1, wherein the styrene-based resin is polystyrene or rubber-reinforced polystyrene (HIPS).

10. A thermoplastic resin composition according to claim 1, wherein the composition has Izod impact strength of not less than 9 kgf.cm/cm.

11. A thermoplastic resin composition comprising:
(A) 95 to 5 parts by weight of an aromatic polycarbonate,
(B) 5 to 95 parts by weight of a styrene-based resin, and
(C) a polyphenylene ether and a saturated polyester, the amount of component (C) being 1 to 50 parts by weight based on 100 parts by total weight of the components (A) and (B), and the composition having Izod impact strength of not less than 9 kgf.cm/cm.

12. A thermoplastic resin composition comprising:
(A) 95 to 5 parts by weight of an aromatic polycarbonate,
(B) 5 to 95 parts by weight of a styrene-based resin, and
(C) a polyphenylene ether, a saturated polyester and a phosphorous ester compound, the amount of component (C) being 1 to 50 parts by weight based on 100 parts by total weight of the components (A) and (B), and the composition having Izod impact strength of not less than 9 kgf.cm/cm.

* * * * *